G. EYERS.
ROAD SCRAPER.
APPLICATION FILED JULY 19, 1912.
1,103,951.
Patented July 21, 1914.
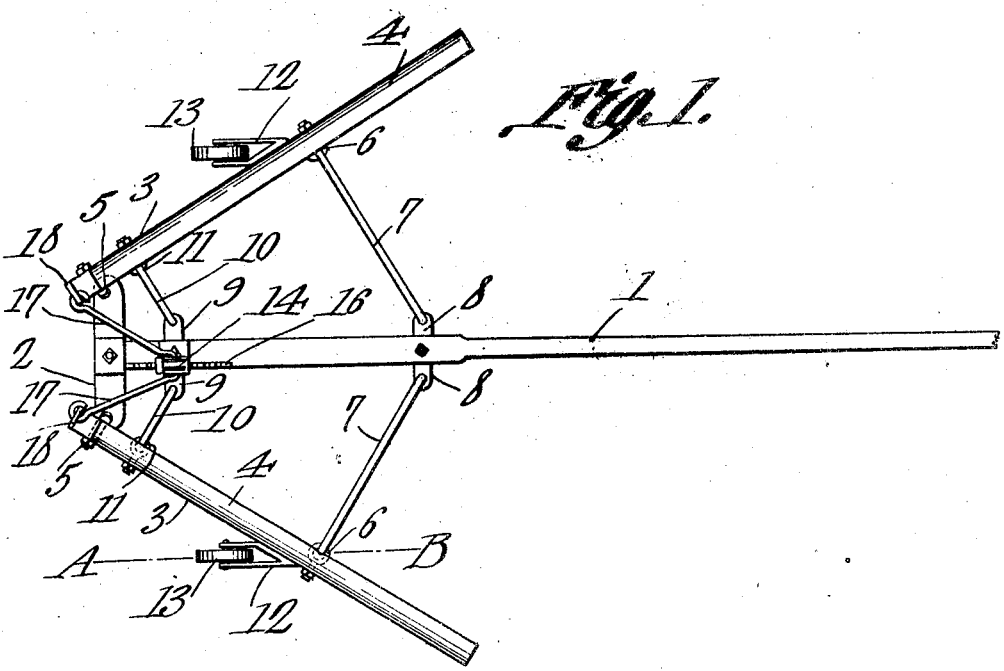
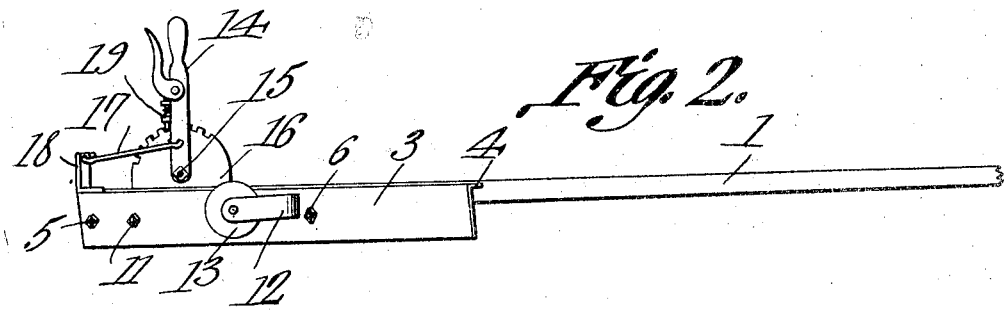
George Eyers,
inventor
Witnesses
by
Attorneys

UNITED STATES PATENT OFFICE.

GEORGE EYERS, OF MARSHFIELD, WISCONSIN.

ROAD-SCRAPER.

1,103,951.  Specification of Letters Patent.  Patented July 21, 1914.

Application filed July 19, 1912. Serial No. 710,504.

*To all whom it may concern:*

Be it known that I, GEORGE EYERS, a citizen of the United States, residing at Marshfield, in the county of Wood and State of Wisconsin, have invented a new and useful Road-Scraper, of which the following is a specification.

This invention relates to road scrapers, one of its objects being to provide a simple and compact structure of this character which will operate efficiently to level off roads by removing ridges and the like and filling in depressions with the loose dirt thus gathered.

Another object is to provide a scraper the blades of which are adjustable and are constantly under the control of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the scraper. Fig. 2 is a side elevation thereof. Fig. 3 is a section on line A—B Fig. 1 and showing the blade tilted to bring the supporting wheel to active position.

Referring to the figures by characters of reference 1 designates a draft beam having a cross strip 2 secured to the rear end thereof. The beam 1 extends between forwardly diverging scraping blades 3 provided, along their upper edges, with forwardly extending reinforcing flanges 4. The rear end portions of the blades are connected to the ends of the cross strips by eye bolts 5 or the like whereby hinge connections are formed between said cross strip and the scraping blades. Eye bolts 6 are also secured to the blades at points adjacent the centers thereof and are connected, as by means of forwardly converging links 7 to ears 8 extending laterally from the beam 1. Additional ears 9 extend laterally from the beam at points between the cross strip 2 and the ears 8 and are connected, by means of rearwardly diverging links 10, to eye bolts 11 secured to the blades 3. Rearwardly extending brackets 12 are secured to the blades and carry small wheels 13 which, when the blades are in active positions, are supported out of contact with the ground.

A lever 14, is fulcrumed as at 15, upon a toothed segment 16 upstanding from the beam 1 and connected to this lever are rearwardly diverging links 17, the rear ends of which are secured to upstanding arms 18 upon the rear ends of the scraper blades 3. Lever 14 has a spring pressed pawl 19 for engaging the toothed segment 16 whereby said lever can be locked in any position to which it may be adjusted.

It will be apparent that when the lever 14 is in upstanding position, the lower edges of the scraping blades 3 will lie in contact with the surface to be acted on so that, when the beam 1 is drawn forward, these blades will scrape said surface and deflect the loosened soil inwardly toward the center of the space between the blades. By providing the link connections between the blades and the beam, said blades are free to flex upwardly and downwardly to a certain extent so as to conform automatically to any irregularities in the general contour of the surface over which the scraper is drawn. Should it be desired to shift the blades out of active positions, lever 14 is swung rearwardly so as to cause the links 17 to press outwardly upon the arms 18. The blades 3 will thus be rotated about lines extending through the connections between the links 7 and 10 and the blades and, as a result, the brackets 12 and wheels 13 will be swung downwardly so as to thus bring the wheels in contact with the ground. By then locking the lever 14 against further movement, it will be seen that the wheels 13 will travel along the ground and the blades will be supported out of contact with the ground.

What is claimed is:—

The combination with a draft beam and a cross strip at one end thereof, of forwardly diverging scraping blades, eye bolts connected to each blade, one eye bolt on each blade movably engaging one end of the cross strip, front and rear pairs of links connected to the remaining eye bolts, the links of each pair converging forwardly and being pivotally connected to the sides of the beam, rearwardly extending brackets secured to the blades adjacent the centers thereof, wheels journaled within the brackets, upwardly extending arms fixedly connected to the rear end portions of the blades, a lever fulcrumed on the beam, and link connections between said lever and the respective arms, said lever and connections constituting means for simultaneously rotating the blades about their respective longitudinal axes to bring either the wheels or the lower edges of the blades into contact with the ground, and means for holding the lever in any position to which it may be shifted.

In testimony that I claim the foregoing as my own, I have hereto affixed my signature in the presence of two witnesses.

GEORGE EYERS.

Witnesses:
H. F. THIEL,
ANNIE E. THIEL.